United States Patent Office 3,383,339
Patented May 14, 1968

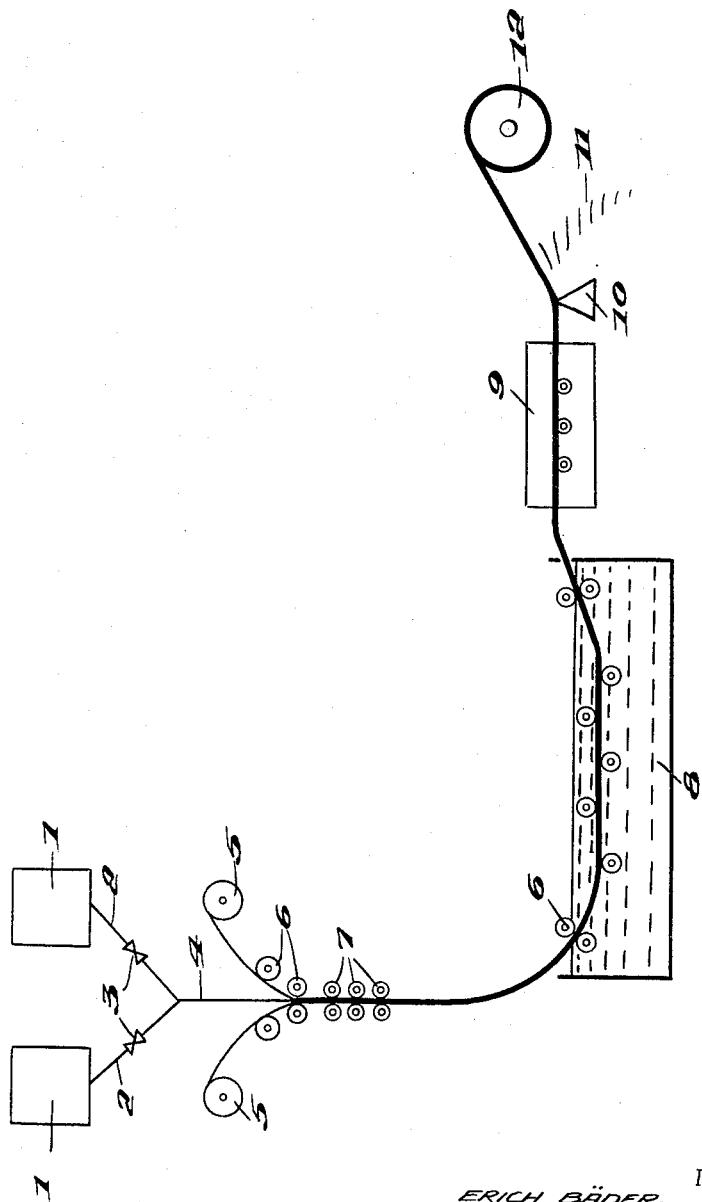

3,383,339
POLYMERIZATION OF VINYL COMPOUNDS IN THE PRESENCE OF BLOWING AGENTS
Erich Bäder, Hanau am Main, Werner Unseld, Neider-rodenbach, Hans Landsfeld, Hanau am Main, and Gerhard Morlock, Gross-Auheim, Germany, assignors to Deutsche Gold- und Silber-Scheideanstalt vormals Roessler, Frankfurt, Germany
Filed June 15, 1964, Ser. No. 375,244
Claims priority, application Germany, Nov. 28, 1963, D 43,040
7 Claims. (Cl. 260—2.5)

ABSTRACT OF THE DISCLOSURE

Method for the bulk polymerization of a polymerizable mass capable of producing a foamed polymerized product comprising monomeric material consisting of at least one polymerizable monomer having a terminal $$CH_2=C<$$

group in intimate mixture with a blowing agent with the aid of a catalyst comprising continuously introducing the polymerizable mass into a flexible tube shaped synthetic resin structure and continuously passing the thus filled tube through a polymerization zone maintained at the polymerization temperature required for the polymerizable mass until the polymerization has been effected.

---

The present invention relates to an improved process for the polymerization of polymerizable monomers having a terminal $CH_2=C<$ group, especially methyl methacrylate and other lower alkyl esters of acrylic or methacrylic acid in the presence of blowing agents whereby a foamed polymerization produce may be produced directly during such polymerization or a polymerization product containing the blowing agent is obtained which can be foamed subsequently.

It is known that porous masses or porous shaped structures can be produced from polymers by polymerizing solutions or homogeneous mixtures of gas evolving blowing agents, polymerizable monomers and, if necessary, or desired, catalysts, accelerators and/or polymers under such conditions that the blowing agent is not activated and subsequently heating the resulting polymerized compositions, if desired, in molds to temperatures at which the blowing agent is activated to evolve gases and at which the polymer softens. Liquids which do not dissolve or only slightly swell the polymeric compositions and have a boiling point lower than the softening point of such polymeric compositions but are soluble in the starting monomers or partial polymerization products thereof have been used as blowing agents. In carrying out the process described above for the production of foamed products one, for example, can introduce a polymerization catalyst as well as a blowing agent into a solution of a polymer in the monomer formed either by partial polymerization of the monomer or by dissolving the polymer in the monomer and permit the catalysed blowing agent containing mixture to stand for several days at room temperature until it is polymerized. The resulting mass is then heated in a mold to produce a porous shaped structure. Such process, however, has the following disadvantages.

The average time required for the polymerization is several days up to weeks when temperatures between about 30 and 35° C. are used. While such time may be shortened by using higher temperatures, 18 to 60 hours are still required for the polymerization. In addition, the cost of the apparatus required is higher in view of the necessity of using pressurized vessels. Several weeks are also required to introduce the required amount of blowing agent if a liquid blowing agent is to be introduced into the polymer by stirring the polymer in the liquid blowing agent. The procedures mentioned quite naturally are not suited for continuous operation and in view of the reaction or soaking periods required tie up the apparatus used for long periods. Such procedures also only produce polymerized compositions containing the blowing agents and the foaming is always carried out as a separate step. Previously it has not been possible to effect the foaming during the polymerization step.

Recently several processes have been described for the production of blowing agent containing bead polymers. This procedure, however, also does not lend itself to continuous operation. In addition, the reaction mixture contains about 50% of water which must be heated up during the polymerization, then be cooled down again and subsequently be processed as it contains substances derived from the polymerization reaction which preclude its direct disposal.

According to the invention it was found that foamable or foamed polymeric compositions can be produced continuously from polymerizable monomers having a terminal $CH_2=C<$ group, preferably methyl methacrylate or its copolymers with other comonomers, by polymerizing such monomers or their mixtures or their syrupy solutions in the presence of blowing agents with the aid of polymerization catalysts and, if desired, of accelerators and, if desired, with exclusion of air or oxygen within hollow bodies of synthetic resins, if the material to be polymerized is continuously introduced into a tube shaped synthetic resin structure with practically complete displacement of air therein, and continuously passing the thus filled structure through a polymerization zone heated to the polymerization temperature, preferably through a liquid bath heated to the polymerization temperature to effect the curing thereof and, if desired, simultaneous foaming thereof.

The process according to the invention renders it possible selectively either to produce foamable polymerized compositions or to produce foamed polymerized compositions directly. The polymeric products produced in either instance distinguish themselves by their extroardinarily high purity so that further processing to practically colorless products is possible. When the polymerization is effected in a liquid bath, preferably a water bath held at polymerization temperature, the polymerization inhibiting effect of the air or oxygen is completely avoided. After completion of the polymerization and of the foaming, if effected simultaneously, the polymerized product is removed from the tube and the material of the tube used for other uses or reused. It is possible to produce new webs for the production of fresh tubes without difficulty if the tube material, for example, is polyethylene so that practically no waste occurs.

The process according to the invention solves the difficulty in handling and transporting the highly viscous masses which are formed during bulk polymerization in that the mass to be polymerized is continuously provided with a surrounding casing which continuously moves along with the mass during the polymerization and such casing is continuously removed after completion of the polymerization. It is of advantage if the filled tubes are passed through the polymerization zone in as flat a form as possible. In this way the problem of the rapid removal of the heat of polymerization is solved, especially when a liquid bath is employed in such polymerization zone. This naturally is the case when one works with thicknesses of only several mm. or at most several cm. It is possible in this way to carry out the polymerization more quickly and thereby attain higher velocities for the continuously moving material so as to increase the economy of the process.

When foamable polymerized compositions are to be produced by the process according to the invention blowing agents which are not activated at the temperatures required or occurring during the polymerization are admixed homogeneously with the polymerizable starting mixture. If solid blowing agents of the decomposable type are employed their decompositions temperature should lie below the temperature at which the polymerization is effected. For example, the polymerization can be effected at a bath temperature of about 75° C. If, on the other hand, relatively low boiling liquids which do not dissolve or at most only slightly swell the polymeric product produced are used as blowing agents, it is desirable to select a catalyst system which permits the polymerization to be carried out at as low a temperature as possible below the boiling point of such liquids. Known redox catalyst systems are suitable for this purpose. Also, the boiling point of the liquid selected as the blowing agent should be below the softening point of the polymeric product produced.

The foamable polymeric product after completion of the polymerization is removed from the casing, comminuted and then foamed in a known manner at an appropriate temperature in a mold or in an extruder.

When foamed polymeric products are to be produced directly this can be accomplished by appropriate selection of a blowing agent which is activated at a temperature at which the polymerization is carried out so that the foaming already occurs while the composition is being polymerized within the tubular casing. In this instance the tubular casing is only filled with so much starting material that the foamed polymeric product can be produced without rupturing the casing.

Vinyl compounds, such as styrene or acrylates, such as butyl acrylate, and their substitution products, such as esters of methacrylic acid, such as, for example, the preferred methyl methacrylate and butyl methacrylate, can be used as the materials to be polymerized. In addition, vinyl acetate and acrylonitrile may also be employed. Furthermore, mixtures of such materials can also be employed, such as, for example, of methyl methacrylate with acrylates, especially butyl acrylate, or with butyl methacrylate. Styrene can also be used as a comonomer.

It usually is advantageous to start with solutions of polymers in monomers having a syrupy consistency. The polymeric component may be a polymer of the monomer employed, as well as a copolymer. When the monomeric substances polymerize alone with sufficient rapidity, the pressure of a polymer can be omitted.

Preferably the starting material is in the form of a prepolymer (partial polymer) obtained, for example, by partial polymerization in a so-called single pot reaction in the presence of catalysts and, if desired, chain transfer agents.

The known ionic and free radical forming catalysts for vinyl polymerization can be used in the usual quantities for the curing of the polymerizable masses according to the invention. Peroxidic compounds or their mixtures and also azo compounds have proved particularly suitable. The so-called redox catalysts are also suited.

Known blowing agents can be employed according to the invention, such as, for example:

Azo compounds, such as, azoisobutyronitrile, azohexahydrobenzonite, azodicarbonamide, diazoaminobenzene.

Sulfohydrazides, such as, benzene sulfohydrazide, benzene-1,3-disulfohydrazide, diphenylsulfone - 3,3' - disulfohydrazide, diphenyloxide-4,4'-disulfohydrazide.

N-nitroso compounds, such as, dinitrosopentamethylenetetramide, N,N' - dinitroso-N,N'-dimethyl-terephthalamide.

Azides, such as, terephthalazide, p-tert-butylbenzazide.

Volatile liquids, such as, cyclopentane n-pentane, petrol ether, hexane and the like.

In carrying out the process according to the invention the catalyst and the blowing agent can be admixed with the mass to be polymerized just before it is introduced into the tubular casing. If prepolymers are used the catalyst still remaining from their production can be used or supplemented. If rapidly acting catalyst systems are to be used the material to be polymerized can be divided into two portions and only such components of the catalyst system are admixed with each portion that each portion by itself possesses sufficient stability but that when such portions are admixed, a complete catalyst system causing rapid polymerization is provided. Such admixture, for example, can be effected by supplying the portions through separate conduits to a mixing head so that the mixture is formed just prior to its introduction into the tubular casing. The continuous introduction of the material into the tubular casing is carried out in such a way that all of the air therein is displaced practically completely. Preferably, a protective atmosphere is employed to assist in ensuring as complete exclusion of air or oxygen as possible. The filled casing is then passed through a polymerization zone, preferably, a liquid bath maintained at the polymerization temperature necessary. Instead of a liquid bath a heating flue, preferably, operated with a protective gas, such as nitrogen, can also be used in the polymerization zone. After the filled casing has been cured during the passage through the polymerization zone it may, if desired, also be passed through a tempering zone. Thereafter, the polymer is removed from the casing and, for example, comminuted. It also is possible to pass the filled casings through the polymerization zone, especially when foamed products are produced directly, in such a way and in such a form that shaped structures such as sheets or plates are produced directly. In principle, the polymer produced by the continuous process according to the invention can be processed to other desired products by conventional procedures.

Instead of admixing the catalyst or catalyst system with the material to be polymerized before the latter is introduced into the casing as described above, it is also possible to and sometimes very advantageous to apply the catalyst and/or accelerator or accelerator system to the inner surfaces of the tubular casing so that they are contacted with the material to be polymerized when it is introduced into the casing. The application of such catalyst and/or accelerator or accelerator system can be in the form of a solution or a paste shortly before the material to be polymerized is introduced.

As material for the tubular casing in which the polymerization according to the invention is carried out, polyethylene is most preferred. However, polypropylene as well as other synthetic materials, such as polyterephthalate, cellophane, polyvinyl alcohols cross-linked with formaldehyde or polyacrolein and fluorine containing resins can also be used.

The tubular structure for the casing can, for example, be produced by extrusion using an annular nozzle which is also provided with a central opening for the introduction of the material to be polymerized. However, an inert gas instead of air is required for blowing the tube. This method of tube formation, however, is not the most economical as the blowing of the tube is rather slow in comparison to the polymerization speeds attainable. It has proved more satisfactory to form the tubular structure by welding together the edges of one or two preformed weldable synthetic resin strips and shortly after formation of the tubular structure introducing the material to be polymerized, for example, through a tube extending into the interior thereof. Instead of using the welding technique, the tubular structure can also be formed from a strip or several strips by closure with the aid of clamps, sewing, or an adhesive or an adhesive strip.

The accompanying drawing diagrammatically shows an apparatus suitable for carrying out the process according to the invention.

With reference to such drawing, separate portions of the materials to be polymerized are supplied from storage containers 1 over conduits 2 provided with regulating valves 3 to common conduit 4 where they are mixed. Each portion of the material to be polymerized, for example, contains a different component or components of a complete catalyst system, for instance, one can contain the oxidizing component and the other the reducing component of a redox catalyst system. Two continuous strips of polyethylene film from rolls 5 run off continuously over guiding elements 6 and through welding elements 7 which serve to weld together the edges of the two polyethylene strips to form a tube. As soon as the tube is formed, the polymerizable mixture is introduced into such tube at a sufficient rate that the tube is completely filled therewith and therefore is free of air. The filled tube is passed with the aid of guide elements 6 continuously through liquid bath 8 which is maintained at the polymerization temperature and, if desired, thereafter through a tempering chamber 9. Thereafter the tubular casing is cut open with knives 10 and the polymer 11 removed therefrom. The opened tubular casing is continuously moved on by roller 12.

Similarly, instead of welding together two polyethylene strips to form the tubular casing, a preformed tubular casing can be employed which is slit open on one side to permit continuous introduction of the material to be polymerized and after such introduction reclosed, for example, by welding. When the preformed tubular casing was rolled up, as usually would be the case, substantially all of the air would have been displaced therefrom so that the use of a protective gas during introduction of the material to be polymerized is unnecessary and other measures for displacing the air are not required.

The following examples will serve to illustrate the process according to the invention. In such examples the proportions are given in parts by weight unless otherwise specified.

Example 1

(a) Syrup preparation.—35,000 parts of methyl methacrylate were heated together with 70 parts of benzoyl peroxide and 80 parts of n-octyl-mercaptan in a pressure tight vessel provided with a stirrer to 80° C. within 15 minutes. Thereafter, the pressure was adjusted to 400 torr and the temperature maintained constant for 50 minutes. Thereupon the polymerization was stopped by rapid cooling of the reaction mixture to room temperature. A syrup of a viscosity of about 2500 cps. was obtained.

(b) Bulk polymerization.—35,000 parts of the syrup were mixed with 35 parts of n-octyl-mercaptan, 140 parts of benzoyl peroxide and 175 parts of azodicarbonamide and degasified by application of a vacuum. The syrup was then continuously filled into a polyethylene tube which with the aid of suitable guide rolls was then flattened out to give a strip of rectangular cross-section 6 mm. thick. The thus flattened structure was continuously passed through a water bath maintained at 75° C. so that it remained in such water bath for 40 minutes. Polymerization of the syrup occurred during its passage through the water bath. Thereafter the polyethylene was stripped away from the resulting polymer and such polymer comminuted on a mill. The resulting foamable product could be foamed in an appropriate mold at about 200° C.

Example 2

(a) Syrup preparation.—31,500 parts of methyl methacrylate, 3500 parts of styrene, 70 parts of benzoyl peroxide and 70 parts of n-octyl-mercaptan were mixed and heated to 80° C. in 15 minutes and the pressure adjusted to 400 torr as described in Example 1. After 30 minutes the temperature was raised to 90° C. and held constant for 50 minutes. Then the polymerization was short stopped by rapid cooling to room temperature.

(b) Bulk polymerization.—35,000 parts of the syrup together with 140 parts of benzoyl peroxide and 350 parts of azodicarbonamide were polymerized in a polyethylene tube at an 80° C. water bath temperature as described in Example 1 and the polymer comminuted after removal from the polyethylene tube. An excellent foamable product resulted.

Example 3

(a) Syrup preparation.—24,500 parts of methyl methacrylate, 10,500 parts of ethyl methacrylate and 140 parts of benzoyl peroxide were mixed, heated to 80° C. in 15 minutes and the pressure adjusted to 400 torr as described in Example 1. A constant temperature of 80° C. was maintained for 55 minutes and the polymerization then short stopped by rapid cooling to room temperature.

(b) Bulk polymerization.—A mixture of 35,000 parts of the syrup, 300 parts of benzoyl peroxide, 100 parts of dimethyl-p-toluidine and 2100 parts of n-pentane was filled into a polyethylene tube as described in Example 1 so that a rectangular structure 3 mm. thick resulted. The thus filled tube was passed through a water bath heated to 30° C. The heat released during the polymerization caused the temperature within the tube to rise above the boiling point of the n-pentane which caused foaming of the product. After removal of the polyethylene tube a band of foamed polymer was obtained.

Example 4

(a) Syrup preparation.—31,500 parts of methyl methacrylate, 3500 parts of butyl methacrylate, 105 parts of benzoyl peroxide and 35 parts of n-octyl-mercaptan were mixed, heated to 80° C. within 15 minutes and the pressure adjusted to 400 torr as described in Example 1. After 45 minutes the polymerization was short stopped by rapid cooling to room temperature.

(b) Bulk polymerization.—A mixture of 35,000 parts of the syrup, 105 parts of dimethyl-p-toluidine, 315 parts of benzoyl peroxide and 350 parts of azodicarbonamide was polymerized in a polyethylene tube in 40 minutes as described in Example 1b, except that a water bath temperature of 30° C. was used. After stripping off the polyethylene tube and comminuting an excellent foamable product resulted.

We claim:

1. In a method for the bulk polymerization of a polymerizable mass capable of producing a foamed polymerized product comprising monomeric material consisting of at least one polymerizable monomer having a terminal $CH_2=C<$ group in intimate mixture with a blowing agent with the aid of a catalyst, the steps of continuously introducing the polymerizable mass into a flexible tube shaped synthetic resin structure and continuously passing the thus filled tube through and in contact with a polymerization zone which is in the form of a liquid bath maintained at the polymerization temperature required for the polymerizable mass until the polymerization has been effected.

2. The method of claim 1 in which said synthetic resin is a polyolefin.

3. The method of claim 2 in which said polyolefin is polyethylene and said material is selected from the group consisting of methyl methacrylate and mixtures of methyl methacrylate with monomers copolymerizable therewith having a terminal $CH_2=C<$ group.

4. The method of claim 2 in which the polymerization temperature is below the temperature at which the blowing agent is activated.

5. The method of claim 4 in which the filled tube is flattened out substantially during its passage through the liquid bath.

6. The process of claim 1 in which said polymerization is carried out at a temperature above the temperature at which the blowing agent is activated.

7. The process of claim 1 in which said polymerizable mass also comprises a polymer dissolved in said monomeric material to provide a syrupy solution.

References Cited

UNITED STATES PATENTS

| | | | |
|---|---|---|---|
| 2,681,321 | 6/1954 | Stastny et al. | 260—2.5 |
| 2,921,006 | 1/1960 | Schmitz et al. | 204—159.22 |

MURRAY TILLMAN, *Primary Examiner.*

W. J. BRIGGS, Sr., *Assistant Examiner.*